United States Patent [19]

Cullingford et al.

[11] Patent Number: 5,196,069

[45] Date of Patent: Mar. 23, 1993

[54] APPARATUS AND METHOD FOR CELLULOSE PROCESSING USING MICROWAVE PRETREATMENT

[75] Inventors: Hatice S. Cullingford, Houston, Tex.; Clifford E. George, Starkville, Miss.; George R. Lightsey, Starkville, Miss.

[73] Assignee: The United States of America as represented by the United States National Aeronautics and Space Administration, Washington, D.C.

[21] Appl. No.: 728,901

[22] Filed: Jul. 5, 1991

[51] Int. Cl.$^5$ .................. C13K 1/02; D21C 3/20; D21C 5/00

[52] U.S. Cl. .................................. 127/37; 127/1; 127/2; 162/72; 162/76; 162/50

[58] Field of Search .............. 162/72 B, 5, 50, 147, 162/192, 189; 127/37, 1, 2

[56] References Cited

U.S. PATENT DOCUMENTS

| | | | |
|---|---|---|---|
| 4,000,032 | 12/1976 | Bergstrom et al. | 162/21 |
| 4,304,649 | 12/1981 | Han et al. | 204/160.1 |
| 4,576,609 | 3/1986 | Hageman et al. | 162/50 |
| 4,769,082 | 9/1988 | Kumakura et al. | 127/37 |

OTHER PUBLICATIONS

Enzymatic Hydrolysis of Cellulose, Theory and Applications, C. R. Wilke et al., Chemical Technology Review #218, 1983.

Enhancement of Enzymatic Susceptibility of Lignocellulosic Wastes by Microwave Irradiation, Jun-ichi Azuma et al., Journal of Fermentation Technology, vol. 62, #4, pp. 377-384, 1984.

Enzymatic Hydrolysis of Cellulose & Simultaneous Fermentation to Alcohol, P. J. Blotkamp et al., American Institute of Chemical Engineering (AIChE) Symposium Series No. 181, vol. 74, 1981, pp. 85-90.

Primary Examiner—Theodore Morris
Assistant Examiner—P. L. Hailey
Attorney, Agent, or Firm—Hardie R. Barr; Guy M. Miller; Edward K. Fein

[57] ABSTRACT

A method for pretreating a cellulosic waste product with microwaves is disclosed as well as a method and apparatus for converting cellulosic wastes into soluble saccharides. The invention greatly enhances a reaction rate for enzymatic hydrolysis. A feed mixture of cellulose, water and acetic acid are irradiated with microwaves at a superatmospheric pressure in an autoclave reaction vessel and the treated cellulose is enzymatically hydrolyzed in a bioreactor. The acid and enzymes are optionally separated for reuse. As a feed stock for the culture of microbes, the sugars can be further processed into ethanol or food protein. High yield, low hazard potential, low energy usage and ready preparation in space of acetic acid and the enzyme makes the present invention well suited for use on long duration space missions.

16 Claims, 1 Drawing Sheet

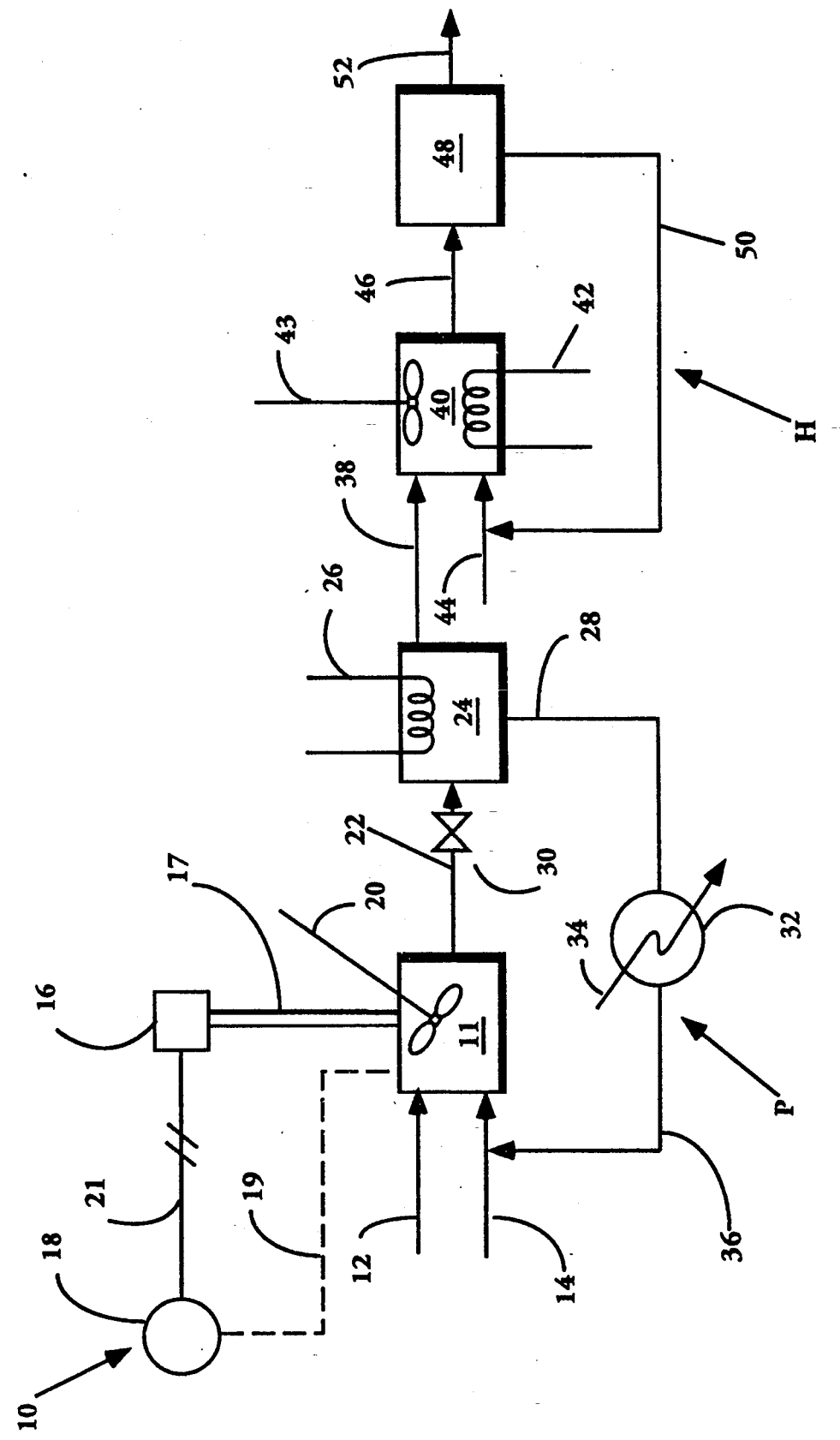

APPARATUS AND METHOD FOR CELLULOSE PROCESSING USING MICROWAVE PRETREATMENT

ORIGIN OF THE INVENTION

The invention described herein was made by an employee of the United States Government, and others, and may be manufactured and used by and for the Government of the United States of America for governmental purposes without the payment of royalties thereon and therefor.

FIELD OF THE INVENTION

The present invention relates to an apparatus and method for converting cellulose-based waste into water soluble saccharides, and more particularly to an apparatus and method wherein a microwave radiation pretreatment may be used to enhance the reaction rate of an enzymatic hydrolysis of the cellulosic polysaccharides.

BACKGROUND OF THE INVENTION

Plant material wastes (biomass) are made up of five main components: cellulose, hemicellulose, lignin, crude protein and ash. Cellulose is generally a linear, unbranched glucose-based homopolymer, i.e., a polysaccharide, of relatively high molecular weight. Hemicellulose is typically a branched and/or unbranched polymer of D-glucose, D-mannose, L-arabinose and D-xylose of about 100-200 sugar residues per polymer chain. Lignins are amorphous crosslinked phenolic polymers that occur uniquely in vascular plants and comprise 20-30% of most wood.

Processing of biomass is important in several industries such as waste management, pulp and paper, food manufacture, and energy production among others. For example, it is known to hydrolyze cellulosic materials into monosaccharides for varying purposes including feed stocks for other chemicals, food stuffs, fuels, and the like. In addition, conversion of biomass to sugars usable directly as food or as chemical reagents is an interest in planning long-term space missions. In space, the fixation of carbon dioxide into edible biomass can be performed by agronomical species such as wheat, potatoes, soybeans, and the like. However, only half of the crop is edible. Of the inedible portion, approximately 50-68 percent is polysaccharide which can be reduced into fermentable sugars. The remainder is primarily unusable lignin. Waste paper produced in space is another source of usable polysaccharide since it is primarily cellulose.

Reduction of polysaccharides by hydrolysis is well known in the art. Two basic methods are generally used: (1) chemical treatment, e.g., reduction using an acid catalyst; and (2) biological breakdown using enzymes or microbes such as fungus. Such methods generally include one or more pretreatments to increase hydrolysis reaction rate and yield. Pretreatments typically increase the availability and surface area of reducible polysaccharides by disturbing the physical and molecular structure of the feed material and/or fractionating the lignocellulosic material into its lignin, hemicellulose and cellulose components.

Examples of common pretreatment techniques include milling and sizing; steam solubilizing in the presence of chemicals such as caustic widely used in pulp and paper manufacture, ammonia, chlorite, sulfur dioxide, amines, acids both dilute and concentrated, etc.; autohydrolysis by high temperature steam (i.e., 220°-275° C.); steam explosion (a forceful extrusion of a steam/feed mixture through an orifice by a sharp pressure drop across the orifice); and electron irradiation. In a given process, common pretreatments may be combined. Additional details surveying the prior pretreatment art are described in Petersen et al., *The Engineering Society for Advancing Mobility Land Sea Air and Space* (SAE International) technical paper 901282, Jul. 9-12, 1990.

The drawbacks of both of these types of processes are evident. The reaction rate of enzymatic hydrolysis is low and a significant concentration of undesirable byproducts such as furfural can result. Concentrated acid-catalyzed hydrolysis produces little or none of the byproducts seen in enzymatic hydrolysis and has a higher reaction rate, but acid consumption is high and product recovery from the reaction effluent is expensive. Health and environmental hazards are also present. Dilute acids can be used, but sugar degradation and yield reduction can, and usually do occur. Pretreatments in both these processes consume energy in the form of steam. Where chemicals are used, they must be removed from the end product. Even with the prior art pretreatment, enzymatic hydrolysis is relatively slow and undesired byproducts are still present.

In space missions, a unique set of constraints are presented. The expendable materials used in the process must either be carried as part of the mission payload or be produced on board the space habitat or vehicle. The availability of energy sources is likewise limited. While sulfuric acid is an excellent catalyst for the hydrolysis reaction, it is difficult to manufacture in space. Enzymes, on the other hand, can theoretically be made in space, but the primary problem of low yield remains. The constraints of space limit the suitability of pretreatments using steam and many chemicals since the preparation and recycle of the required chemicals is generally difficult. Steam production is also energy intensive and the furfural byproduct requires a relatively complex separation step.

J. Azuma et al., *Journal of Fermentation Technology*, Vol. 62, No. 4, pp 377-384 (1984), discloses a microwave radiation pretreatment method for enzymatic saccharification of lignocellulosic wastes. Enzymatic susceptibility of the wastes is said to be improved by aqueous microwave pretreatment above 160° C. with maximum improvement at 223°-228° C. Following pretreatment, maximum yield of reducing sugars is 77-84% of the polysaccharide present in the original lignocellulose waste.

P. J. Blotkamp et al., *American Institute of Chemical Engineering (AIChE) Symposium Series* No. 181, Vol. 74(1981), describes a simultaneous saccharification of cellulose and fermentation to ethanol utilizing enzymes of the mold *Trichoderma reesea* and the yeast *Saccharomyces cerevisiae*. The hydrolysis rate was said to increase when compared to saccharification alone due to removal of competitive inhibition by glucose and cellobiose.

Accordingly, there remains a need for low energy consumption, low complexity apparatus and method for the conversion of cellulosic wastes into soluble saccharides suitable for terrestrial or space use wherein the chemicals utilized are not extremely hazardous, easily recyclable and can be prepared in space. Furthermore, it would be advantageous if such an apparatus and method produced soluble saccharides without unwanted decomposition byproducts such as furfural.

SUMMARY OF THE INVENTION

The present invention is based on the discovery of a physicochemical pretreatment which greatly enhances the reaction rate and reduces the energy consumption of enzymatic hydrolysis of cellulosic waste materials. The pretreatment method comprises irradiating an aqueous cellulose feed mixture with microwave energy in an autoclave reactor in the presence of acetic acid while maintaining an advanced equilibrium pressure. The invention is well suited for use in space since energy usage is low and chemicals utilized are not hazardous, they are easily recycled and can be prepared in space. The sugars recovered can be used directly as food or converted, e.g., via microbial action, into other types of food, into fuels (e.g., alcohols via fermentation) or other organic chemicals.

In one embodiment, the present invention provides a method for pretreating cellulose for enzymatic hydrolysis. The method comprises irradiating cellulose with microwaves at superatmospheric pressure in the presence of water and acid effective to substantially enhance enzymatic hydrolysis. A mass ratio of acid to cellulose is from about 1 to about 10:1. The irradiating step is preferably maintained at an equilibrium pressure of from about 4 to about 10 atm.

In another embodiment, the present invention provides a method for converting cellulose into saccharides. The method comprises the steps of: irradiating cellulose in the presence of water and acid, preferably acetic acid with microwaves at superatmospheric pressure for sufficient length of time to enhance hydrolyzability; and enzymatically hydrolyzing the irradiated cellulose to form soluble saccharides. The irradiating step is maintained at an equilibrium pressure of from about 2 to about 20 atm, preferably from about 4 to about 10 atm. A mass ratio of acid or water to cellulose is from about 1 to about 10:1, preferably from about 3:1 to about 7:1. A mass ratio of acid to water is from about 1 to about 10:1, preferably from about 0.5 to about 2:1. The enzyme preferably comprises cellulase prepared from a culture of *Trichoderma viride* and the hydrolyzing step is preferably operated at a temperature of from about 35° C. to about 45° C. and a pH of from about 4.5 to about 5.5. The method may further include, separating the acid from the irradiated cellulose solids wherein the separated acid may be recycled to the irradiating step, separating the enzymes from the saccharides wherein the separated enzymes may be recycled to the hydrolyzing step and fermenting the saccharides into ethanol.

In a further embodiment, the present invention provides an apparatus for converting a cellulose into saccharides, comprising: an autoclave reactor having an agitator and a pressure controller; a first charge to the autoclave reactor comprising an aqueous mixture of cellulose and an acid; a microwave radiation source for energizing the cellulose; a hydrolysis vessel having temperature and pH control; a second charge to the hydrolysis vessel comprising an aqueous mixture of the irradiated cellulose and enzymes suitable for hydrolyzing the irradiated cellulose into soluble saccharides; and means for transferring the irradiated cellulose to the hydrolysis vessel.

BRIEF DESCRIPTION OF THE DRAWING

The FIGURE shows a schematic representation of the cellulose conversion apparatus of the present invention.

DETAILED DESCRIPTION OF THE INVENTION

A process and associated apparatus for converting cellulosic waste (biomass) into soluble saccharide has been developed. By irradiating an aqueous cellulose feed mixture with microwave radiation in the presence of acetic acid at an elevated pressure, the efficiency obtained from an enzymatic hydrolysis is greatly enhanced. Furthermore, in comparison to the prior art processes, hazards and energy requirements are reduced, complexity of the process/apparatus is low and the concentration of undesirable byproducts is minor.

These advantages make the present invention ideally suited for application in long duration space missions. Such missions will depend on a controlled ecological life support system (CELSS), e.g., hydroponics, to produce food and it would be beneficial to efficiently use cellulose-based wastes. Any suitable apparatus for converting such wastes into soluble saccharides has to be relatively self-contained, use chemicals which are not hazardous and operate under less hazardous conditions such as low pressure or temperature. Such chemicals must be easy to reuse and/or produce on the spacecraft without overburdening the payload. Similarly, limited access to energy supplies and equipment requires that the severity of process conditions must be light. These are additional features of the present invention.

An apparatus 10 of the present invention is divided into two sections, the microwave pretreatment P and the enzymatic hydrolysis H. While not wishing to be held to any theory, the microwave pretreatment P is thought to disrupt crystallinity of cellulose-based polymers to enhance enzyme affinity. In the treatment, the acid is sorbed at sites in the polymer. The acid enhances impact of the radiation by preferentially absorbing microwave energy. Also as part of the pretreatment, any lignocellulose materials may be fractionated into components. The fractionated feed is thought to be easier to digest.

The microwave pretreatment P comprises irradiation of a cellulose-based feed stream 12 in an autoclave type reactor vessel 11 by microwave radiation produced by a microwave source 16. The microwaves preferably pass from the source 16 to the reactor 11 through a waveguide 17. The feed 12 is mixed with an aqueous acid stream 14 prior to energizing by the microwave radiation. The reactor 11 is provided with an agitator 20 and a pressure controller 18. Typically the pressure controller 18 includes a programmable electronic device such as a microprocessor which senses the pressure in the reactor 11 via a conventional pressure transducer and compares the input to a programmed value. As a response to deviation from the programmed value, the controller 18 adjusts the rate of the microwave source 16 by means of an electronic signal 21 conveyed to the source 16. Such control schemes are well known. The reactor can also be equipped with a pressure relief valve as a safety feature.

The reactor 11 is preferably operated at a controlled equilibrium pressure in a range of from about 2 atm to about 20 atm, more preferably from about 4 atm to about 10 atm, to obtain useful pretreatment of the feed material 12. The upper limit on the operating pressure is set by the design requirements of the reactor 11, the power requirements of the microwave source 16, and possibly the maximum temperature tolerated by the feed material without decomposition into undesired carbonaceous matter. Reactor temperature generally corrosponds to the saturation temperature. The time length of the pretreatment P at the equilibrium pressure should be sufficient to effect enhancement of the subsequent hydrolysis rate. Typically, the feed 12 is pretreated for a time period of from about 1 to about 120 minutes, preferably of from about 5 to about 60 minutes.

The feed material as previously mentioned is irradiated in the presence of an aqueous acid. The feed material preferably comprises cellulosic materials having a low amount of lignins. In general suitable feed materials include plant wastes which are mostly cellulose and hemicellulose, such as plant stems, leaves, stalks, stover, husks, hulls, waste paper, and the like. The aqueous acid may be a mineral or organic acid. Examples of mineral acids include sulfuric, hydrochloric, phosphoric, and the like. Examples of organic acids include acetic, citric, tartaric, formic, propanoic, propenoic, and the like. Non-toxic acids are preferred with acetic acid especially preferred.

The acid is used in a mass ratio of from about 1 to about 10 per unit of cellulose-based matter, preferably from about 3:1 to about 7:1. Water is used in a mass ratio of from about 1 to about 10 per unit of cellulose-based matter, preferably from about 3:1 to about 7:1. The mass ratio of acid to water is from about 0.1:1 to about 10:1, preferably from about 0.5:1 to about 2:1.

A slurry effluent stream 22 exiting the reactor 11 is passed through the depressurization valve 30 into a separation vessel 24 wherein solids are retained. A gas/liquid stream 28 comprising water and acetic acid passes into a condenser 32 wherein vapors are condensed to liquid. Means for separating a liquid and solid are well known to include filtration, decanting, centrifuging, evaporation, and the like. The vessel 24 can include a heater 26 to enhance the vaporization of the volatile water and acid components. The condenser 32 uses an heat exchange medium 34 such as cooling water to condense the water/acid vapor. The condensed aqueous acid 36 is then available for reuse in the autoclave 11. Prior to use, the recycle stream 36 can be retained in a storage vessel (not shown) until needed.

The hydrolysis section H of the apparatus 10 of the present invention comprises a hydrolysis vessel 40 such as a bioreactor. The present invention may optionally include a sugar recovery means 48. The bioreactor 40 is designed for incubating enzymes obtained from biological organisms at temperature and pH conditions which promote enzyme activity (i.e., digestion of cellulose-type materials). Therefore the bioreactor 40 is temperature controlled by a cooling/heating coil 42, for example, and a thermostat (not shown). The bioreactor 40 may also include a pH control means (not shown) comprising a pH meter and means for metering a pH increasing or pH decreasing fluid into the reactor 40. In place or an active pH control means, pH can be substantially controlled by using a well buffered reaction medium. The bioreactor 40 also preferably has an agitator 43.

A treated solids stream 38 retained by the separator 24 is transferred to the bioreactor 40 by conventional means such as, for example, water flushing. The treated solids are mixed with a stream 44 of suitable enzymes dissolved in an appropriate reaction medium in the bioreactor 40. The mass ratio of enzymes to solids is from about 0.001:1 to about 0.25:1, preferably from about 0.01:1 to about 0.15:1.

Cellulose digesting enzymes are known as cellulase. Cellulase may be obtained commercially from Meiji Seika Kaisha Industry, Co., Ltd. of Japan under the tradename MEICELASE. Cellulase can be produced from a culture of the mold *Trichoderma viride* and the fungus *Aspergillus niger*. Optimal conditions for cellulase activity such as MEICELASE are a temperature of from about 35° C. to about 45° C. and a pH of from about 4.5 to about 5.5. The preferred reaction medium is a suitably buffered aqueous acetic acid solution.

The time required to achieve maximum conversion depends on a variety of factors including pretreatment process condition, bioreactor conditions, enzyme quality, and the like. Some experimentation may be necessary to maximize reaction rate. We have found that nearly complete conversion of available polysaccharides was obtained in 72 hours. Greater reaction rates may be possible.

Following the complete conversion of the polysaccharides into soluble saccharides or some suitable level of conversion, a reaction effluent stream 46 comprising soluble saccharides, enzyme solution and insoluble material is optionally directed to the sugar recovery means 48 which may be a separator apparatus to remove insoluble material. Such insolubles can be removed by any method known in the art such as filtration, decanting or centrifuging. A product stream 52 comprises a solution of sugars and enzymes in the aqueous reaction medium. The insoluble material may comprise undigested cellulose and hemicellulose but mainly lignin, crude protein and ash components of the feed material. Such wastes may be subject to appropriate further processing or disposal. The product stream 46 may be used directly where insoluble materials are not detrimental to succeeding processing step such as fermentation.

The product stream 52 (or 46) may be used as is or be processed further. Where further processing is desired, the sugars in stream 52 may be fermented into alcohols by suitable microbes such as yeasts. Alcohols can be used for fuels or as a starting material for making other organic chemicals including acids, esters, aldehydes, ketones, hydrocarbons, and the like by means known to the art. The sugars can also be processed into carbohydrates and protein food stuffs by culturing other types of microbes such as algae or fungi.

It may be desirable to also separate the enzyme catalyst from the soluble sugars in the product stream 46 (e.g., in space where enzyme supply is limited) to avoid excessive enzyme usage. The separator 48 may optionally include a means for separating the enzyme from the soluble sugars. Several separation techniques are known to differentiate substances by molecular size. Ultrafiltration using an exchange membrane is one method. Liquid chromatography is another. The separated enzymes may be recycled in stream 50 for reuse in the bioreactor 40. Such recycled enzymes can be stored until needed in an appropriate manner to maintain enzyme activity by means known in the art.

It must be noted that the cellulosic waste feed 12 may require physical preparation prior to the microwave pretreatment. Biomass is usually initially milled by means known to the art into a finely divided mesh. Typical milling techniques include the use of shredding, knife mills, hammer mills, disk refining, vibratory rod milling and agitation bead milling. The size of such particles should be adequate for conducting the enzymatic hydrolysis. In so far as hydrolysis efficiency may depend on milling and sizing the feed material, some experimentation may be needed to specify an optimal mesh size.

Biomass may also be fractionated separately if necessary by means known to the art to remove excessive lignins. Such means generally comprises, processing by acid at an elevated temperature (e.g., with pressurized steam). Where lignin removal is inconvenient such as in space, a low lignin feed biomass can be utilized. Paper is a good source of a low lignin cellulose.

The present invention is useful in several applications. Extracting increased food value from crops grown in CELSS on board spacecraft is one space usage. Similar advantage can be gained on earth. Other equally important terrestrial applications include as economical processes for producing ethanol and disposing of waste paper while gaining a valuable endproduct. The present invention, it is contemplated, may find use as a small home appliance for disposing waste paper in addition to commercial scale plants in the waste processing and disposal industry.

The method of the invention is illustrated by the following examples:

EXAMPLES 1–6 AND COMPARATIVE EXAMPLES 1–5

A corn stover biomass comprising about 40 percent by weight cellulose and 30 percent by mass hemicellulose was hydrolyzed in an apparatus of the present invention to optimize process variables for the irradiation pretreatment. Process variables studied included mass ratios of water:stover and acetic acid:stover, equilibrium pressure and ratio of microwave power to total sample mass. At the end of 72 hours reaction time for each run, a yield was calculated. Pretreatment time for each run was 10 minutes and the stover feed used was initially milled to a finely divided state.

Following the microwave radiation pretreatment, enzymatic hydrolysis was conducted in a 40° C. incubated shaker bath using the enzyme Meicelase. For each hydrolysis, a 0.12 to 0.15 gram sample of the irradiated stover was added to 10 ml of a 0.1M acetic acid solution buffered by sodium acetate to a pH of about 5.0. To this mixture, enzyme was added in an amount of 0.08 gram enzyme/gram stover sample. The reaction rate was monitored by analyzing for glucose at 24 hour intervals. Twenty µl aliquots of solution were withdrawn and injected directly into a Yellow Springs Instruments (YSI) glucose analyzer. A blank enzyme solution was also incubated to measure background glucose. This value was subtracted from the sample measurements.

Results are shown in the Table. While not exhaustive, hydrolysis reaction rate improved strongly when both water and acetic acid mass ratios were in largest excess and the equilibrium pressure was higher during the microwave radiation pretreatment. Both the blank sample (hydrolyzed without pretreatment) and the samples pretreated in an absence of acetic acid gave yields of about 30% indicating the importance of the acid during the pretreatment stage. For the pretreatment feed composition which gave the best conversion yields, (Examples 3 and 6) increasing the equilibrium pressure from 4.4 atm to 7.8 atm (about 77%) strongly enhanced final glucose conversion rate, i.e., 60% versus 98%. The power input had seemingly small if any impact on the reaction rate.

TABLE

| Ex. | Microwave Pretreatment Composition (mass ratio) | | | Unit Power Input (watts/gram) | Equil. Pressure (atm) | Conversion to Glucose (%) | | |
|---|---|---|---|---|---|---|---|---|
| | Acetic acid | Water | Stover | | | 24 Hrs. | 48 Hrs. | 72 Hrs. |
| 1 | 1 | 4 | 1 | 7.3 | 7.8 | 43 | 60 | 67 |
| 2 | 2 | 4 | 1 | 6.3 | 7.8 | 44 | 66.5 | 73 |
| 3 | 4 | 4 | 1 | 4.9 | 7.8 | 52.5 | 65 | 98 |
| 4 | 1 | 4 | 1 | 7.3 | 4.4 | 43 | 54 | 54 |
| 5 | 2 | 4 | 1 | 6.3 | 4.4 | 48 | 54 | 55 |
| 6 | 4 | 4 | 1 | 4.9 | 4.4 | 54 | 59 | 60 |
| Comp. 1 | 0 | 0 | 1 | 15 | 7.8 | — | — | 30 |
| Comp. 2 | 0 | 2 | 1 | 15 | 7.8 | — | — | 32 |
| Comp. 3 | 0 | 4 | 1 | 15 | 7.8 | 30 | 34 | 35 |
| Comp. 4 | 0 | | 1 | | 4.4 | | | 36 |
| Comp. 5 | — | — | — | — | — | 26 | 29 | 30 |

The foregoing description of the invention is provided for illustrative purposes. Many variations and modifications of the invention will become apparent to those skilled in the art in view of the foregoing disclosure. It is intended that all such variations and modifications within the scope or spirit of the appended claims be embraced thereby.

What is claimed is:

1. A method for converting cellulose into saccharides, comprising, the steps of:
   (a) irradiating cellulose in the presence of water and an organic acid with microwaves at superatmospheric pressure for sufficient length of time to enhance hydrolyzability, said organic acid being selected from the group comprising; acetic acid, citric acid, tartaric acid, formic acid, propanoic acid, and propenoic acid;
   (b) enzymatically hydrolyzing said irradiated cellulose to form soluble saccharides, wherein a mass ratio of said enzymes to said irradiated cellulose is from about 0.01:1 to about 0.015:1.

2. The method of claim 1, wherein said irradiating step is regulated at a pressure between about 2 atm to about 20 atm.

3. The method of claim 1, wherein said irradiating step is regulated at a pressure between about 4 atm to about 10 atm.

4. The method of claim 1, wherein said cellulose is substantially free of lignin.

5. The method of claim 1, wherein said cellulose is mechanically milled.

6. The method of claim 1, wherein said cellulose is selected from the group consisting of waste paper, stover, husks and chaff.

7. The method of claim 1, wherein said acid comprises acetic acid.

8. The method of claim 1, wherein a mass ratio of said acid to said cellulose is from about 1:1 to about 10:1.

9. The method of claim 1, wherein a mass ratio of said water to said cellulose is from about 1:1 to about 10:1.

10. The method of claim 1, wherein a mass ratio of said acid to said water is from about 0.1:1 to about 10:1.

11. The method of claim 1, wherein said enzymes comprise cellulase prepared from a culture of *Trichoderma viride* and said hydrolyzing step is operated at a temperature of from about 35° C. to about 45° C. and a pH of from about 4.5 to about 5.5.

12. The method of claim 1, further comprising separating said enzymes from said soluble saccharides and recycling said separated enzymes to said hydrolyzing step.

13. The method of claim 9, wherein said enzyme separating step comprises ultrafiltration.

14. The method of claim 1, further comprising fermenting said soluble saccharides.

15. A method for converting cellulose into saccharides, comprising, the steps of:
  (a) irradiating cellulose in the presence of water and an organic acid with microwaves at superatmospheric pressure for sufficient length of time to enhance hydrolyzability, said organic acid being selected from the group comprising; acetic acid, citric acid, tartaric acid, formic acid, propanoic acid, and propenoic acid;
  (b) enzymatically hydrolyzing said irradiated cellulose to form soluble saccharides, and
  (c) separating said acid from said irradiated cellulose prior to said hydrolyzing step and recycling said separated acid to said irradiating step.

16. An apparatus for converting a cellulose into saccharides, comprising:
  (a) an autoclave reactor having an agitator and a pressure controller, said autoclave reactor being adapted for receiving a first charge comprising an aqueous mixture of cellulose and an organic acid;
  (b) a microwave radiation source for energizing the cellulose;
  (c) a hydrolysis vessel having temperature and pH control, said hydrolysis vessel being adapted for receiving a second charge comprising an aqueous mixture of said irradiated cellulose and enzymes suitable for hydrolyzing said irradiated cellulose into soluble saccharides; and
  (d) means for transferring said irradiated cellulose to said hydrolysis vessel.

* * * * *